(12) United States Patent
Ishida

(10) Patent No.: US 7,764,480 B2
(45) Date of Patent: Jul. 27, 2010

(54) ELECTRONIC DEVICE, AND CIRCUIT AND METHOD FOR PROTECTING THE SAME

(75) Inventor: Takayasu Ishida, Kakegawa (JP)

(73) Assignee: NEC Corporation (JP)

( * ) Notice: Subject to any disclaimer, the term of this patent is extended or adjusted under 35 U.S.C. 154(b) by 1523 days.

(21) Appl. No.: 10/868,740

(22) Filed: Jun. 15, 2004

(65) Prior Publication Data

US 2004/0264091 A1 Dec. 30, 2004

(30) Foreign Application Priority Data

Jun. 24, 2003 (JP) ............................. 2003-180254

(51) Int. Cl.
*H02H 9/08* (2006.01)
(52) U.S. Cl. ..................... 361/93.1; 361/93.9
(58) Field of Classification Search ............. 361/86, 361/87, 91.1, 111, 93.7–93.9, 93.1; 330/279, 330/298; 320/134; 303/279, 298
See application file for complete search history.

(56) References Cited

U.S. PATENT DOCUMENTS

| | | | |
|---|---|---|---|
| 5,543,760 A | 8/1996 | Honda et al. ............. 330/298 |
| 5,764,035 A * | 6/1998 | Lee ........................... 320/160 |
| 5,789,984 A * | 8/1998 | Davis et al. ............... 330/279 |
| 5,815,821 A | 9/1998 | Pettersson ................. 455/575 |
| 5,834,978 A * | 11/1998 | Cho ........................... 330/298 |
| 6,195,535 B1 * | 2/2001 | Kurchuk ...................... 455/83 |
| 6,268,713 B1 | 7/2001 | Thandiwe .................. 320/134 |
| 6,950,636 B2 * | 9/2005 | Rozenblit et al. ......... 455/126 |

FOREIGN PATENT DOCUMENTS

| EP | 1227564 | 7/2002 |
|---|---|---|
| EP | 1282211 | 2/2003 |
| JP | 06-260849 | 9/1994 |

* cited by examiner

*Primary Examiner*—Michael Sherry
*Assistant Examiner*—Danny Nguyen
(74) *Attorney, Agent, or Firm*—Hayes Soloway P.C.

(57) ABSTRACT

A mobile terminal uses a battery as a power source, and has a battery protection circuit for protecting the battery. A control circuit of the mobile terminal detects a voltage value or a current value of a predetermined electronic circuit such as a power amplifier, and determines whether or not an abnormal state is present. Upon determination that the power amplifier is in an abnormal state, the control circuit short-circuits the battery to operate the battery protection circuit. As a result, the supplying of a power supply current to the power amplifier is stopped to eliminate the abnormal state.

18 Claims, 4 Drawing Sheets

ELECTRONIC DEVICE, AND CIRCUIT AND METHOD FOR PROTECTING THE SAME

BACKGROUND OF THE INVENTION

1. Field of the Invention

The present invention relates to an electronic device, and a circuit and a method for protecting the same, and more particularly to a portable electronic device in which a battery is incorporated and a circuit and a method for protecting the same.

2. Description of the Related Art

Many portable electronic devices use batteries as power sources. The electronic device in which a battery is incorporated usually has a battery protection circuit. In order to prevent performance deterioration or destruction of the battery, the battery protection circuit instantaneously cuts off an excessive current when the excessive current flows out of the battery. This battery protection circuit is operated even when an excessive current flows to an electronic circuit such as a power amplifier. Thus, the battery protection circuit can prevent destruction of the electronic circuit caused by continuous flowing of an excessive current thereto in the electronic device.

A recent portable electronic device such as a cellular telephone has a large display unit, illumination, and camera functions, a vibration motor and the like. Accordingly, power consumption of the cellular telephone has increased. Since the increased power consumption needs a greater supply of a current, an operation threshold level of the battery protection circuit must be set high.

However, the high operation threshold level of the battery protection circuit causes a loss of the aforementioned function thereof to protect the electronic circuit in the electronic device. For example, a large current may flow to an electronic circuit such as a transmission power amplifier directly connected to the battery because of a control abnormality or a component abnormality. In such a case, the battery protection circuit that has the high operation threshold level cannot cut off the battery current quickly. Consequently, the amplifier is irreparably damaged. Japanese Registered Patent No. 3320486 discloses a technology for melting a fuse of an AC power source to cut off the power source when a voltage abnormality is detected in a power amplifier circuit. However, this method cannot cut off a current instantaneously.

SUMMARY OF THE INVENTION

An electronic device of the present invention comprises: a battery protection circuit for stopping a current when the current of a predetermined value or higher is output from a battery; a detection circuit for detecting at least one of a current value and a voltage value of a predetermined circuit in the electronic device; and a control circuit for executing at least one of the stopping of supply of a current to the circuit and the operating of the battery protection circuit if a detected value is outside a tolerance range.

A protection circuit for protecting an electronic device according to the present invention protects an electronic device in which a battery can be incorporated. The protection circuit comprises: a battery protection circuit for cutting off a current when the current of a predetermined value or higher is output from the battery; a detection circuit for detecting at least one of a current value and a voltage value of a predetermined circuit in the electronic device; and a control circuit for operating the battery protection circuit if a detected value is outside a tolerance range.

A method for protecting an electronic device according to the present invention protects an electronic device equipped with a battery protection circuit for cutting off a current when a battery outputs the current of a predetermined value or higher. The method comprises the steps of: monitoring at least one of a current value and a voltage value of a predetermined electronic circuit in the electronic device; determining whether or not a monitored value is within a predetermined tolerance range; and short-circuiting the battery if the monitored value is outside the tolerance range.

According to the present invention, it is possible to cut off an excessive current quickly when it flows to various electronic circuits in the electronic device in which the battery can be incorporated.

DETAILED DESCRIPTION OF THE PREFERRED EMBODIMENTS

Figure 1:
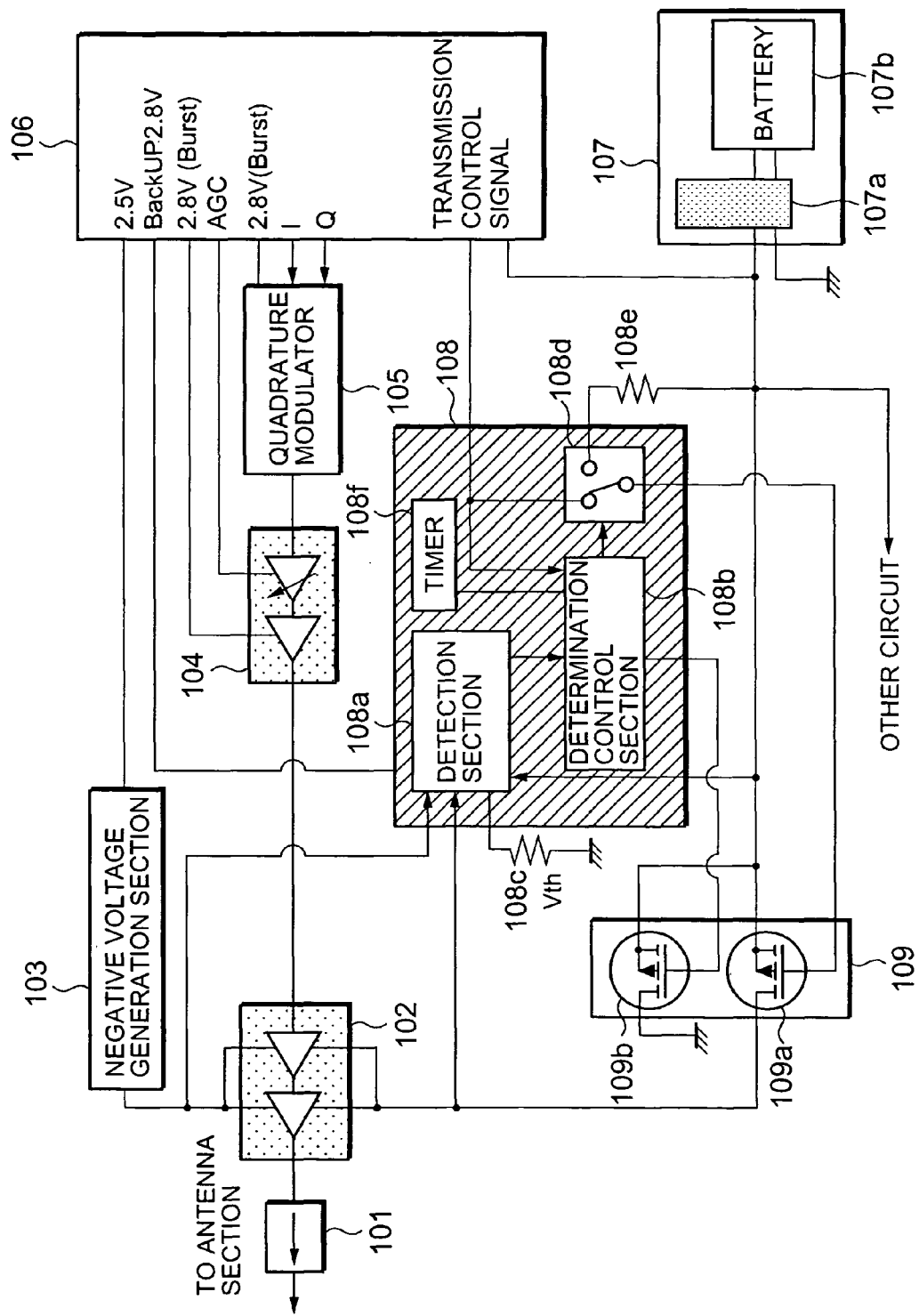
FIG. 1 is a block diagram showing an example of a portable electronic device to which the present invention is applied.

As an example of an electronic device of the present invention, a cellular telephone will be described hereinafter. FIG. 1 is a block diagram showing apart of the cellular telephone. In the example, an operation state of a power amplifier 102 is monitored. The cellular telephone has a battery section 107 as a power source circuit. The battery section 107 has a battery cell 107b; and a battery protection circuit 107a for preventing a flow of a large current to the battery cell 107b. The cellular telephone has a baseband LSI 106, a quadrature modulator 105, a driver amplifier 104, a negative voltage generation section 103, the power amplifier 102 and an isolator 101 as a transmission circuit. The baseband LSI 160 outputs various bias voltages to control transmission/non-transmission. The negative voltage generation section 103 supplies a gate bias voltage to the power amplifier 102.

The cellular telephone has a power amplifier power source control section 109 and a control circuit 108 as a power source control circuit. The power amplifier power source control section 109 has a P channel field effect transistor 109a (hereinafter, abbreviated to an "FET 109a") for switching the supplying/non-supplying of power to the power amplifier 102, and a P channel field effect transistor 109b (hereinafter, abbreviated to an "FET 109b") capable of short-circuiting the battery section 107. The control circuit 108 detects whether or not an electronic circuit (power amplifier 102 in this example) in the cellular telephone is abnormal. If the electronic circuit is abnormal, the control circuit 108 controls turning ON/OFF of the FET 109a and the FET 109b.

Hereinafter, the cellular telephone shown in FIG. 1 will be described more in detail. The baseband LSI 106 receives power from the battery section 107 to output various bias voltages, and transmission signals I and Q. The LSI 106 outputs a burst transmission signal, and outputs a burst bias voltage, and a burst transmission control signal, synchronized with a burst period. Specifically, the LSI 106 outputs a burst bias voltage (2.8V) to the driver amplifier 104 and the quadrature modulator 105, and a bias voltage (2.5 V) to the negative voltage generation section 103. Further, the LSI 106 supplies a backup voltage (2.8 V) to the control circuit 108, and outputs a low-level transmission control signal to the control circuit 108 during a period of transmission and a high-level transmission control signal to the same during a period of non-transmission in synchronization with the burst period. The quadrature modulator 105 subjects the transmission signals I and Q to frequency conversion. Subsequently, the transmission signals I and Q are amplified by the driver amplifier 104 and the power amplifier 102, and supplied through the isolator 101 to the antenna section. The quadrature modulator 105 and the driver amplifier 104 are subjected to bias control based on a burst voltage from the LSI 106, and the transmission signals I and Q are output only during the period of transmission. The power amplifier 102 has a field effect transistor, and a bias voltage is supplied thereto from the negative voltage generation section 102.

The control circuit 108 has a detection section 108a, a determination control section 108b, a resistor 108c, a switch 108d, a pull-up resistance 108e, and a timer 108f. The control circuit 108 can operate even when power is cut off from the battery section 107 since it is operated by a backup power supply from the baseband LSI 106.

In the example, the detection section 108a has one or a plurality of threshold levels (Vth) which are set by the resistor 108c or the like, and detects an output voltage of the negative voltage generation section 103, and a power amplifier power supply voltage which is a voltage between source and drain electrodes of the FET 109a. The detection section 108a determines whether or not a detected voltage value is equal to, higher than, a predetermined threshold level, and outputs a result of the determination to the determination control section 108b.

The determination control section 108b determines that the power amplifier 102 is not abnormal if the detected voltage value is equal to, lower than, the threshold level, and determines that the power amplifier 102 is abnormal if the voltage value, is higher than the threshold level. The determination control section 108b controls the switch 108d and the FET 109a by using the timer 108f based on the determination result from the detection section 108a and the transmission control signal from the baseband LSI 106. If not abnormal, the determination control section 108b sets the FET 109b in an OFF state, and supplies the transmission control signal of the baseband LSI 106 through the switch 108d to a gate of the FET 109a. As a result, the FET 109a is caused to be in an ON state only during the period of transmission, and the power amplifier 102 receives a power supply voltage.

The determination control section 108b determines that the power amplifier 102 is abnormal if the detection section 108a detects a voltage in the drain of the FET 109a during the period of non-transmission (while a transmission control signal is at a high level). The determination control section 108b sets a gate of the FET 109b at a low level by using the timer 108f for a given period. As a result, the FET 109b is caused to be in an ON state to short-circuit an output of the battery section 107. At this time, the battery protection circuit 107a is operated to stop the output of the battery section 107. As a result, an abnormal state in which power is supplied to the power amplifier 102 during the period of non-transmission is forcibly stopped. Additionally, the determination control section 108b controls the switch 108d by using the timer 108f for a given period, and cuts off the gate electrode of the FET 109a from the transmission control signal (low level) to connect it to the pull-up resistance 108e if a voltage of the negative voltage generation section 103 is abnormal during the period of transmission (while a transmission control signal is at a low level), or if a voltage between the source and the drain of the FET 109a is abnormal. Accordingly, since the gate electrode of the FET 109a is caused to be at a high level, and the FET 109a is caused to be in an OFF state for a predetermined time, a power supply current to the power amplifier 102 is cut off. The determination control section 108b turns OFF the FET 109b after a predetermined time has passed, and thus eliminates the short-circuited state. Additionally, the determination control section 108b controls the switch 108d after a predetermined time has passed, and shifts the switch from the pull-up resistance 108e side to the transmission control signal of the baseband LSI 106. As described above, even if the operation threshold level of the battery protection circuit 107 is increased, an abnormal state is quickly eliminated when the abnormality is detected in the electronic circuit aimed at being protected.

Figure 2:
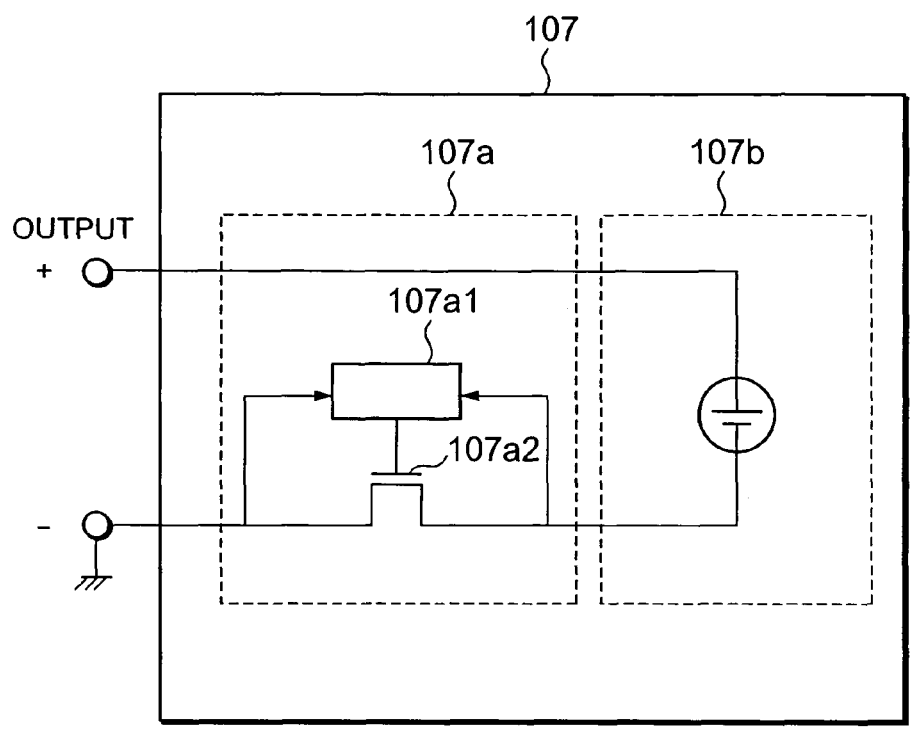
FIG. 2 is a view showing an example of a battery section.

FIG. 2 shows an embodiment of the battery section 107. The battery section 107 has the battery 107b and the battery protection circuit 107a. The battery protection circuit 107a has a battery control circuit 107a1 and a field effect transistor 107a2 (hereinafter, abbreviated to an "FET 107a"). Drain and source electrodes of the field effect transistor 107a2 are connected to a negative side of the battery 107b in series. The battery control circuit 107a1 detects a potential difference between the drain and the source of the FET 107a2, controls a gate thereof when the potential difference comes to be equal to, higher than, a predetermined value, and cuts off a current between the drain and the source. When a battery current is within a normal range, the FET 107a2 is in a conductive state. An increase in the battery current is accompanied by an increase in the potential difference between the drain and the source. When the battery current comes to be equal to, higher than, a predetermined value, the battery control circuit 107a1 cuts off a current of the FET 107a2.

Figure 3:
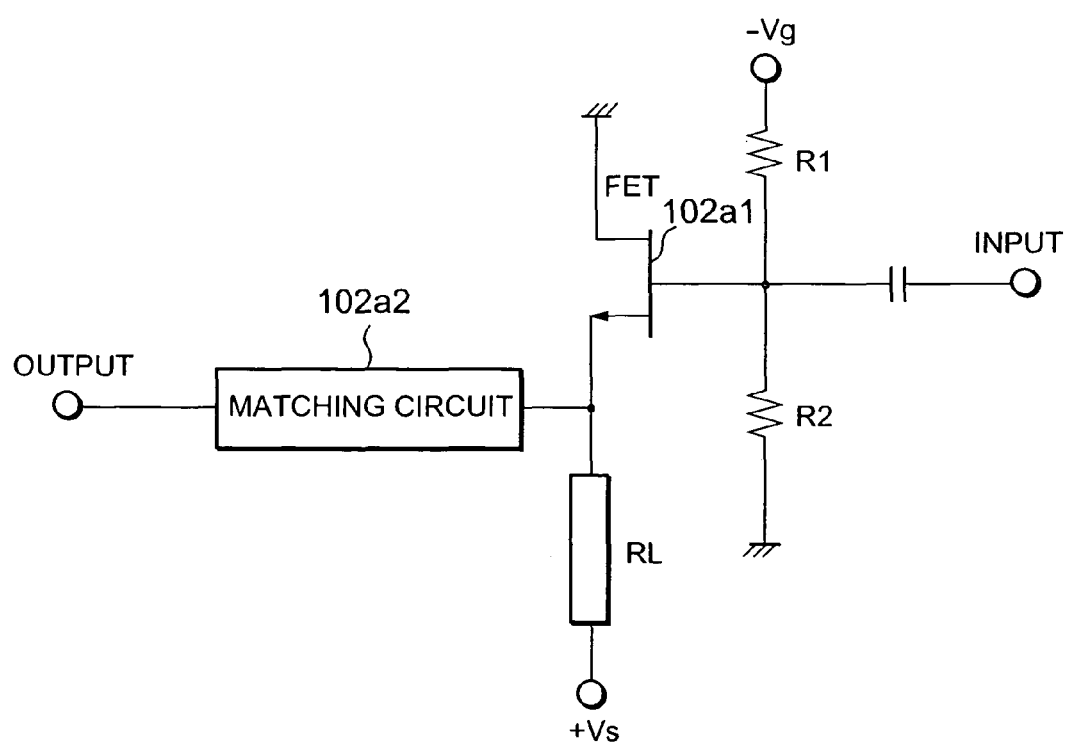
FIG. 3 is a view showing an example of a power amplifier aimed at being protected.

FIG. 3 shows an example of an amplifier of one stage in a multistage power amplifier 102. The field effect transistor 102a1 in a depression type is used as an amplifying element. A negative (i.e. reverse bias) gate bias voltage is applied to the gate electrode by resistance division of resistors R1 and R2. A positive power supply bias voltage is applied through a load R1 to the source electrode. The drain electrode is grounded. This amplifier employs a source follower constitution in which an input signal input to the gate electrode is amplified and output from the source electrode through a matching circuit 102a2. When a gate bias voltage of the reverse bias is lowered or comes to be a zero voltage, a large current flows to the power amplifier 102 based on depletion characteristics. A large current may flow to the source electrode because of abnormalities or the like of the FET 102a1 and the matching circuit 102a2. If such a state continues, circuit destruction may occur.

Next, an example of a normal operation of the cellular telephone will be described. To begin with, the battery section 107 supplies power to each electronic circuit of the cellular telephone. The baseband LSI 106 executes a transmission operation of repeatedly transmitting a burst transmission signal. At this time, the LSI 106 outputs a low-level transmission control signal during the period of transmission, and the determination control section 108b outputs a high-level signal to the base electrode of the FET 109b to turn OFF the FET 109b. The determination control section 108b supplies a transmission control signal through the switch 108d to the gate electrode of the FET 109a. Since the FET 109a is turned ON only when the transmission signal is at a low level, the power amplifier 102 receives power, and is caused to be operated. At this time, the driver amplifier 104 and the quadrature modulator 105 are operated based on a synchronous burst bias voltage, and the cellular telephone executes a transmission operation.

Figure 4:
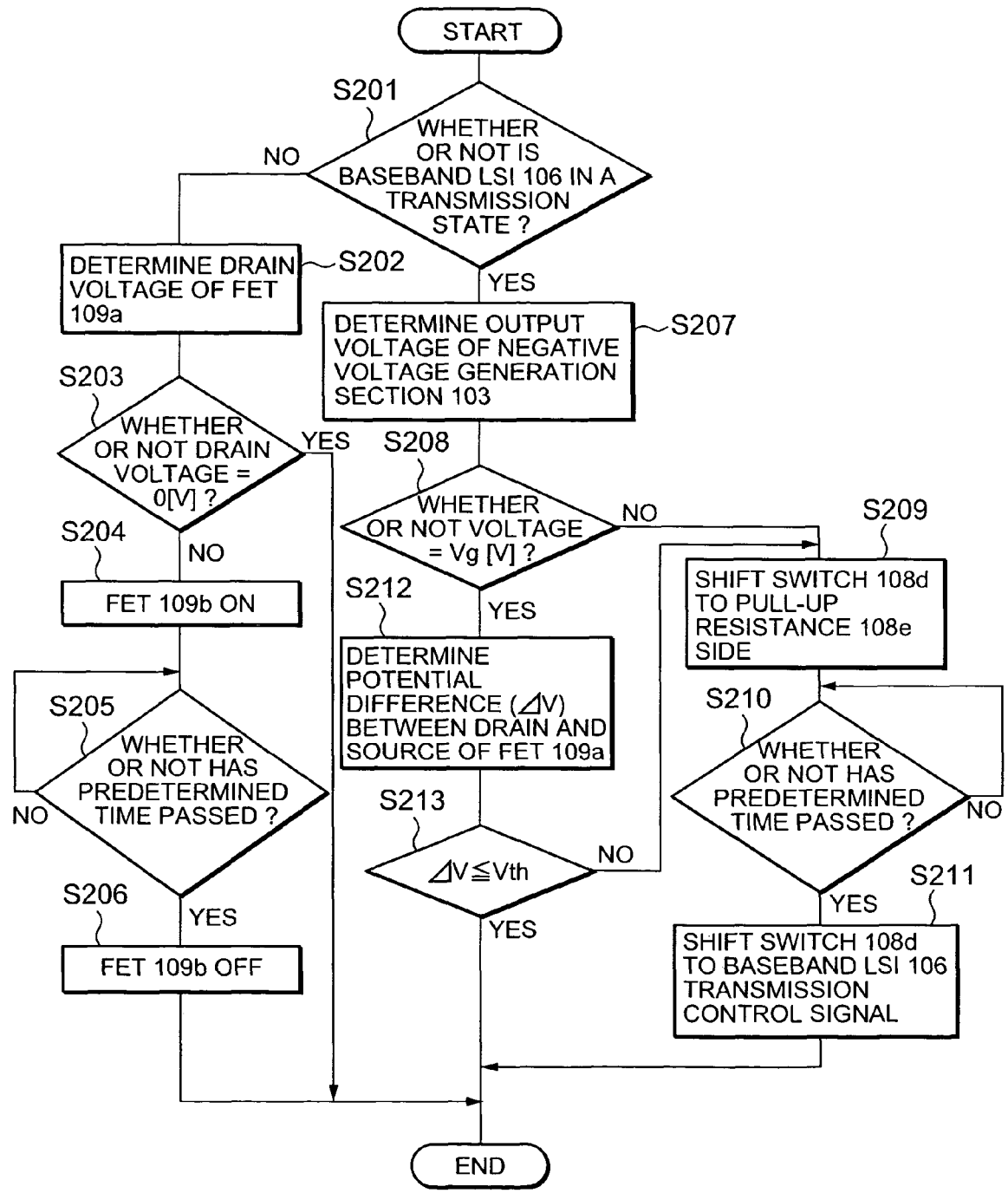
FIG. 4 is a flowchart of an example of a protection operation of an electronic circuit of the invention.

FIG. 4 shows an example of a flow of operation carried out when the cellular telephone is abnormal. First, the determination control section 108b monitors a transmission control signal from the baseband LSI 106 to determine whether the baseband LSI 106 is in a transmission or non-transmission state (S201). In the case that the baseband LSI 106 is in the non-transmission state (NO in S201), the determination section 108b determines a drain voltage of the FET 109a detected by the detection section 108a (S202). The determination control section 108b determines whether or not the drain voltage is 0V (S203). If the drain voltage is 0V (YES in S203), the operation returns to the start. If the drain voltage is not 0V (NO in S203), the determination control section 108b outputs a low-level control signal to the gate of the FET 109b to turn ON the FET 109b (S204). At this time, the output of the battery section 107 is short-circuited at a ground (GND) level to operate the battery protection circuit 107a. A passage of predetermined time is counted by the timer 108f after the short-circuiting (YES in S205). After the passage of predetermined time, the determination section 108b turns OFF the FET 109b (S206) to release the short-circuited state.

In the case that the baseband LSI 106 is in the transmission state (YES in S201), an output voltage of the negative voltage generation section 103 is determined (S207). If the output voltage is not $-Vg$ (NO in S208), the determination control section 108b recognizes an abnormality, and controls the switch 108d to shift the switch to the pull-up resistor 108e (S209). At this time, the gate electrode of the FET 109a is cut off from the transmission control signal of the baseband LSI 106 to be forcibly set at a high level. The FET 109a which is a P channel MOSFET is turned OFF to cut off the supplying of power to the power amplifier 102. Accordingly, the abnormal state is terminated. After a state that the FET 109a is off continues for a time T2 (YES in S210), the determination control section 108b controls the switch 108d to select again the transmission control signal of the baseband LSI 106 (S210). As a result, the FET109a is turned ON to be controlled based on the transmission control signal (S211). If the output voltage of the negative voltage generation section 103 is $-Vg$ (YES in S208), a potential difference $\Delta V$ between the source and the drain of the FET 109a during the period of transmission is detected (S212). If the potential difference $\Delta V$ is lower than a threshold level Vth set by the resistor 108c (YES in S213), the determination control section 108b determines that the power amplifier 102 is normal. If the potential difference $\Delta V$ is higher than the threshold level (NO in S213), the determination control section 108b controls the switch 108d to shift the switch to the pull-up resistor 108e (S209). The gate electrode of the FET 109a is cut off from the transmission control signal of the baseband LSI 106 to be forcibly set at a high level. Subsequently, the operations of S210 and S211 are executed as described above. By these operations, the abnormal state which has occurred in the electronic circuit aimed at being protected is quickly eliminated.

Figure 5:
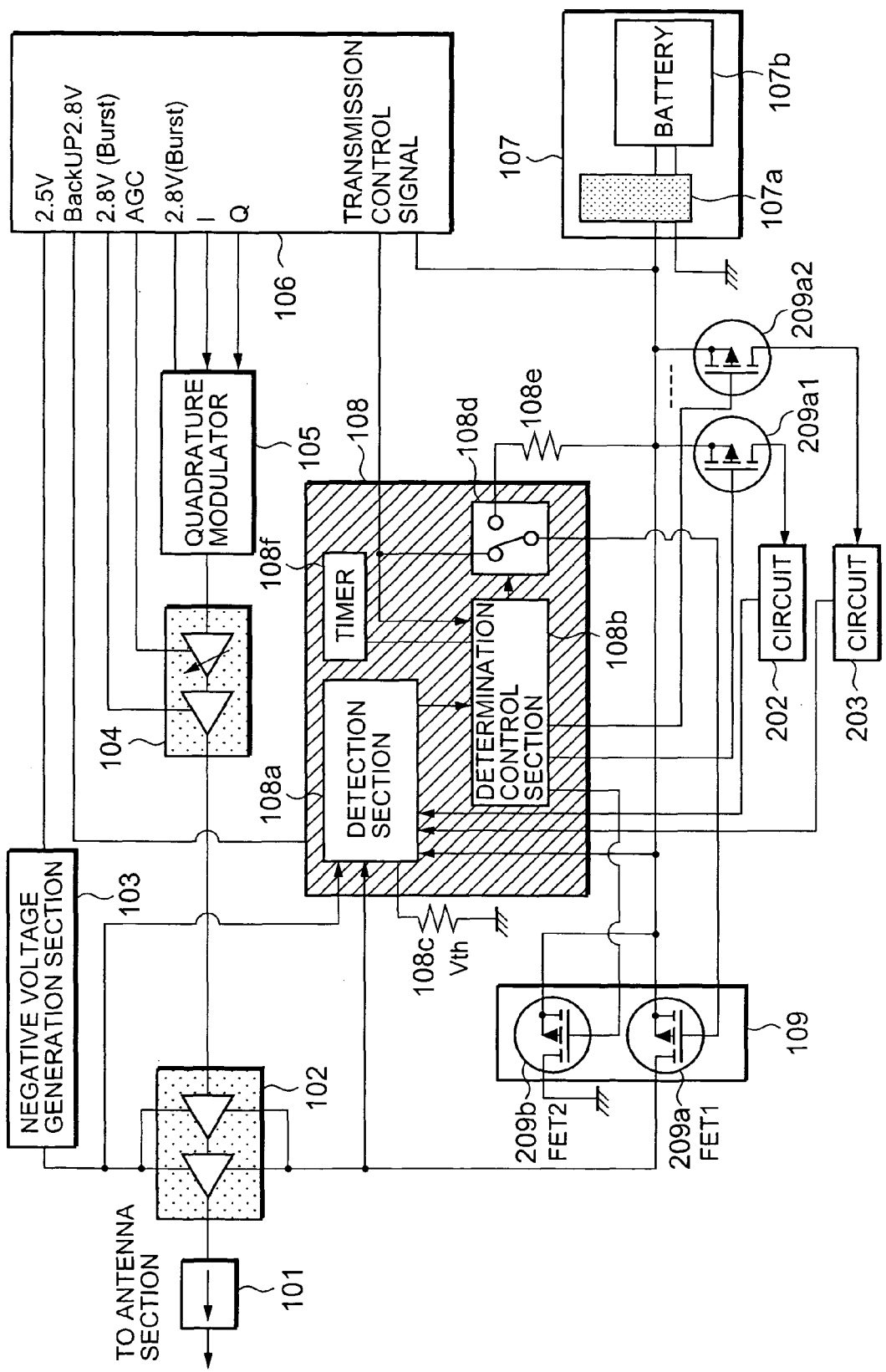
FIG. 5 is a block diagram showing another example of a portable electronic device to which the present invention is applied.

FIG. 5 shows another example of a cellular telephone. In this example, electronic circuits are protected in addition to a power amplifier 102. Examples of electronic circuits are an incoming call informing circuit (e.g., a speaker, a vibration motor or the like), a camera circuit, a display circuit, an illumination circuit, and others. In FIG. 5, these circuits are denoted by reference numerals 202 and 203. However, the number of circuits aimed at being protected can be optionally determined. Field effect transistors 209a1 and 109a2 are arranged corresponding to the circuits 202 and 203. The detection circuit 108a detects a current or a voltage of a predetermined place of the circuits 202 and 203 to compare it with a predetermined threshold level. The determination control section 108b determines whether or not the current value or the voltage value is within a tolerance range irrespective of a transmission/non-transmission state. If the detected value is outside the tolerance range, the determination control section 108b controls the field effect transistor 209a1 or 209a2 to cut off a current to the circuit. The determination control section 108b can simultaneously turn ON the FET 209b to operate the battery protection circuit 107a. The determination control section 108b can turn ON only the FET 209b without controlling the field effect transistor 209a1 or 209a2. For the circuit operating during the period of transmission as in the case of the power amplifier 102, the corresponding field effect transistor is controlled in accordance with a transmission control signal. The determination control section 108b can cut off the transmission control signal when the circuit is abnormal, thereby cutting off a power supply current to the circuit.

In the aforementioned example, an electronic circuit aimed at being protected can be optionally selected. The driver amplifier 104 before the power amplifier 102 can also be controlled by the control circuit 108 and the power source control circuit 109. A plurality of detection places of the electronic circuit aimed at being protected can be set up. The detection circuit 108a can detect at least one of a voltage value and a current value, and output a detection result to the determination control section 108b.

What is claimed is:

1. An electronic device comprising:
   a battery protection circuit for stopping a current from a battery when the current of a predetermined value or higher is output from the battery;
   a detection circuit for detecting at least one of a current value and a voltage value of a predetermined circuit in the electronic device; and
   a control circuit for executing at least one of an operation of the battery protection circuit and the stopping of a current to the predetermined circuit if a detected value of the detection circuit is outside a tolerance range, wherein the electronic device is a portable electronic device, and wherein the control circuit stops supplying of the current to the predetermined circuit during a period of transmission, and operates the battery protection circuit during a period of non-transmission.

2. An electronic device according to claim 1, further comprising:
   a transmission controller for outputting to the control circuit transmission control signals which are different between periods of transmission and non-transmission.

3. An electronic device according to claim 1, wherein the predetermined circuit is at least one selected from an amplifier, an incoming call informing circuit, a camera circuit, a display circuit, and an illumination circuit.

4. A protection circuit for protecting an electronic device in which a battery can be incorporated, comprising:
   a battery protection circuit for stopping a current from a battery when the current of a predetermined value or higher is output from the battery;
   a detection circuit for detecting at least one of a current value and a voltage value of a predetermined circuit in the electronic device; and
   a control circuit for operating the battery protection circuit if a detected value of the detection circuit is outside a tolerance range, wherein the electronic device is a portable electronic device, and wherein the control circuit stops supplying of the current to the predetermined circuit during a period of transmission, and operates the battery protection circuit during a period of non-transmission.

5. An electronic device according to claim 4, further comprising:
a first switch arranged between the predetermined circuit and the battery protection circuit; and
a second switch for short-circuiting the battery.

6. An electronic device according to claim 5, wherein the first switch is ON while the second switch is OFF in an initial state.

7. An electronic device according to claim 6, wherein the control circuit turns OFF the first switch if the detected value of the detection circuit is outside the tolerance range during a period of transmission, and turns ON the second switch if the detected value is outside the tolerance range during a period of non-transmission.

8. An electronic device according to claim 7, wherein the first and second switches return to initial states after a predetermined time has passed.

9. An electronic device according to claim 5, wherein the control circuit includes a third switch for selecting a signal to control the first switch.

10. An electronic device according to claim 5, wherein the detection circuit detects voltage values of both ends of the first switch, and the control circuit controls the first switch in accordance with the detected values.

11. A protection circuit according to claim 4, wherein the control circuit short-circuits the battery for predetermined time if the detected value is outside the tolerance range.

12. A method for protecting a portable electronic device equipped with a battery protection circuit for stopping a current from a battery when a battery outputs the current of a predetermined value or higher, comprising the steps of:
monitoring at least one of a current value and a voltage value of a predetermined electronic circuit in the electronic device;
determining whether the monitored value is within a predetermined tolerance range or not;
short-circuiting the battery for a predetermined time if the monitored value is outside the tolerance range; and
stopping supplying of the current to the predetermined circuit during a period of transmission, and operating the battery protection circuit during a period of non-transmission.

13. An electronic device comprising:
a battery protection circuit for stopping a current from a battery when the current of a predetermined value or higher is output from the battery;
a detection circuit for detecting at least one of a current value of a predetermined circuit the electronic device;
a control circuit for executing at least one of an operation of the battery protection circuit and the stopping of supply of a current to the predetermined circuit if a detected value of the detection circuit is outside a tolerance range;
a first switch arranged between the predetermined circuit and the battery protection circuit; and 14. An electronic device according to claim 13, wherein the first switch is ON while the second switch is OFF in an initial state.

15. An electronic device according to claim 14, wherein the control circuit turns OFF the first switch if the detected value of the detection circuit is outside the tolerance range during a period of transmission, and turns ON the second switch if the detected value is outside the tolerance range during a period of non-transmission.

16. An electronic device according to claim 15, wherein the first and second switches return to initial states after a predetermined time has passed.

17. An electronic device according to claim 13, wherein the control circuit includes a third switch for selecting a signal to control the first switch.

18. An electronic device according to claim 13, wherein the detection circuit detects voltage values of both ends of the first switch, and the control circuit controls the first switch in accordance with the detected values.

* * * * *